Patented June 21, 1938

2,121,520

UNITED STATES PATENT OFFICE 2,121,520

MAINTENANCE OF PHOSPHATE COATING BATHS

Leo P. Curtin, Cranbury, N. J., assignor to Curtin-Howe Corporation, New York, N. Y., a corporation of Delaware No Drawing. Application September 24, 1936, Serial No. 102,441

4 Claims. (Cl. 148—6.5)

This invention relates to the maintenance of phosphate coating baths and it comprises a method of operating phosphate coating baths which comprises maintaining such a bath at an acidity equivalent to that of a soluble dihydrogen phosphate, and keeping the bath charged with a reducing agent not substantially interfering with said acidity and adapted to reduce ferric iron to ferrous iron, thereby preventing the formation of sludge containing ferric iron; all as more fully hereinafter set forth and as claimed.

Providing iron and steel with a protective coating resisting rust and capable of giving a good bond to the paint, lacquer or enamel subsequently applied is effected in various ways. In a well established commercial method, the iron is treated with a bath containing dihydrogen metal phosphate, manganese dihydrogen phosphate being a frequent chief component. Acid phosphates of copper, zinc and iron are also used. There is some advantage in a bath containing phosphates of two metals. An acid phosphate bath in contact with iron or steel tends to form on the metal an insoluble phosphate coating containing ferrous iron. Unless measures are taken to prevent it, there is a considerable evolution of hydrogen during the formation of the phosphate coating on the metal. Evolution of gaseous hydrogen being undesirable, the bath often contains an added substance capable of acting as a depolarizer. Nitrates or chlorates are often used for this purpose. Nitrate has an advantage over chlorate in that it does not produce chlorides in the bath.

In the operation of producing the phosphate coating on the iron, some ferrous iron is produced from the metal and joins the phosphates of the bath, giving a coating layer of complex insoluble phosphates. In addition, invariably more or less ferrous iron goes into the bath as ferrous dihydrogen phosphate. This has no injurious effect as long as it remains in the ferrous condition. Acid ferrous phosphate gives good coatings and ferrous iron is often designedly a component of the bath, as in certain early types of bath made by dissolving iron filings in dilute phosphoric acid.

All ferrous salts in solution have, however, a tendency to oxidize, by atmospheric oxidation or otherwise, forming the corresponding compounds of ferric iron with a corresponding reduction in the acidity of the bath. Furthermore, ferric phosphate is quite insoluble and requires much free acid to hold it in solution over and above the acid corresponding to the dihydrogen metal phosphate. Any substantial increase in the free acid of the bath, over that provided by soluble dihydrogen phosphate, is objectionable because it interferes with the formation of the phosphate coatings on the work, therefore it is neither desirable nor usual to have any greater acidity. In all the commercial phosphate coating solutions therefore, there is either the alternative of using more phosphoric acid than is necessary or desirable for coating purposes or having objectionable amounts of sludge formation in the bath, this sludge consisting largely of complex phosphates containing ferric iron. This sludge interferes with the coating operation.

I have found that I can maintain these coating solutions without objectionable amounts of sludge formation and without the use of undesirably high concentrations of phosphoric acid by maintaining in the solution a small amount of a reagent capable of reducing ferric iron to the ferrous condition. Substances which have been found satisfactory for this purpose include formaldehyde, sodium hyposulfite, sodium thiosulfate and sulfurous acid. The last named substance is the most convenient material for this purpose and it is sufficient to maintain only enough sulfurous acid in the bath to give a distinct test for sulphur dioxide at all times. As little sulphur dioxide as 0.01 per cent is sufficient. Under commercial conditions, it is desirable to have slightly more than this amount, to avoid accidental depletion of the reducing agent, and I prefer to operate with a bath containing from 0.03 to 0.10 per cent of $SO_2$ as free acid. As a convenient means of supplying this acid, sodium bisulfite, $NaHSO_3$, is desirable and this may be used in amounts necessary to give the concentration of $SO_2$ above specified. Sodium sulfite is not desirable because it is a salt of alkaline reaction, usually causing an immediate precipitate of insoluble phosphates when added to the bath, and incapable, except in the presence of free acid, of supplying appreciable concentrations of $SO_2$. The necessary amount of $SO_2$ may also be added as a gas or as a water solution of sulfurous acid. Other reducing agents having the property of reducing ferric iron to the ferrous condition may be used, provided they are compatible with the other components of the bath.

In a particular embodiment of my invention, I use a coating bath solution of manganous and zinc dihydrogen phosphates containing, per liter of solution, the equivalent of 2 grams of MnO, 5 grams of ZnO and 10 grams of $P_2O_5$ and 2.5 grams of sodium bisulfite $NaHSO_3$. As the $SO_2$ concentration gradually diminishes in the course of time, it finally becomes too low to inhibit the oxidation of ferrous to ferric iron. When this condition is noted, the $SO_2$ content of the bath is restored by additions of bisulfite in the needed amount. Often the addition is of 2.5 grams of $NaHSO_3$ for each liter of bath solution. The sulfurous acid liberated from the bisulfite keeps the iron dissolved in the bath in the ferrous condition and prevents any substantial formation of sludge in the bath, keeping the operation smooth and regular with great benefit to the coating produced.

What I claim is:—

1. In the operation of phosphating baths for providing ferrous metals with a protective coating, the process which comprises establishing and maintaining a bath containing as its essential coating ingredient a phosphoric acid compound having an acidity substantially equivalent to that of soluble ferrous dihydrogen phosphate, and preventing the formation of ferric sludge therein by adding to the bath from time to time a reducing agent adapted to supply $SO_2$ to the bath without substantially interfering with the said acidity, said reducing agent being added in a quantity sufficient to keep iron compounds in the bath reduced to the ferrous state and to provide free sulfur dioxide in the bath in a minor concentration of at least 0.01 per cent, as free acid.

2. The process of claim 1, wherein the concentration of free sulfur dioxide in the bath is maintained at about 0.03 to 0.1 per cent.

3. The process of claim 1, wherein the reducing agent is selected from the class consisting of sulfurous acid, sulfur dioxide and soluble bisulfites.

4. The process of claim 1, wherein the sulfur dioxide concentration is established and maintained by additions to the bath of sodium bisulfite in amounts of about 2.5 grams per liter of solution.

LEO P. CURTIN.